(12) United States Patent
Vetrini (10) Patent No.: US 6,716,294 B1
(45) Date of Patent: Apr. 6, 2004

(54) PLANT AND PROCESS FOR AUTOMATICALLY GLUING POLARIZING LENSES

(75) Inventor: Gianni Vetrini, Silvi (IT)

(73) Assignee: Barberini S.p.A., Silvi (IT)

( * ) Notice: Subject to any disclaimer, the term of this patent is extended or adjusted under 35 U.S.C. 154(b) by 0 days.

(21) Appl. No.: 09/673,356

(22) PCT Filed: Apr. 14, 1999

(86) PCT No.: PCT/IT99/00090

§ 371 (c)(1),
(2), (4) Date: Dec. 5, 2000

(87) PCT Pub. No.: WO99/54118

PCT Pub. Date: Oct. 28, 1999

(30) Foreign Application Priority Data

Apr. 17, 1998 (IT) ........................................ RM98A0241
Aug. 4, 1998 (IT) ........................................ RM98A0525

(51) Int. Cl.$^7$ ................................................ B29D 11/00
(52) U.S. Cl. ........................ 156/102; 156/285; 156/295; 156/362; 156/556; 156/559; 264/1.34; 264/101
(58) Field of Search ........................ 156/74, 102, 212, 156/295, 285, 538, 556, 559, 350, 362, 363; 264/1.32, 1.34, 101; 351/163, 177; 359/352, 485

(56) References Cited

U.S. PATENT DOCUMENTS

| | | | |
|---|---|---|---|
| 3,994,760 A | * 11/1976 | Park | 156/102 |
| 4,199,538 A | * 4/1980 | Wu | 264/2.3 |
| 4,959,118 A | * 9/1990 | Herbin et al. | 156/512 |
| 5,171,386 A | * 12/1992 | Schiavone et al. | 156/73.1 |
| 5,351,100 A | * 9/1994 | Schwenzfeier et al. | 351/164 |
| 5,503,694 A | * 4/1996 | Abrams | 156/64 |
| 5,961,777 A | * 10/1999 | Kakinuma | 156/380.9 |
| 6,177,032 B1 | * 1/2001 | Smith et al. | 264/1.32 |

FOREIGN PATENT DOCUMENTS

| | | |
|---|---|---|
| WO | WO 89/07091 | 8/1989 |
| WO | WO 95/08133 | 3/1995 |

* cited by examiner

Primary Examiner—Jeff H. Aftergut
Assistant Examiner—John T. Haran
(74) Attorney, Agent, or Firm—Young & Thompson

(57) ABSTRACT

A plant for the continuous production of polarizing lenses includes a coil polarizing film feeding station; a glass convex lens feeding station; a concave lens feeding station; an under vacuum film shaping station; a deposition and gluing outer convex lens station; a translation station for the pre-glued lenses; a deposition and gluing inner concave lens station; a lens separation and film cutting station; and a palletization station for the finished lenses; and a method.

33 Claims, 5 Drawing Sheets

PLANT AND PROCESS FOR AUTOMATICALLY GLUING POLARIZING LENSES

The present invention relates to plant and process for automatically gluing polarising lenses.

More specifically, the invention relates to plant and process of the above kind allowing to obtain in a completely automatic manner a so called "coupled" polarised lens (lens-film-lens) having a null power, to be used for sunglasses.

In other words, the invention allows to automatically produce polarised blanks for the subsequent production of glass lenses.

Coming now to provide as an introduction some information concerning the polarising lenses, it is well known that visible light is comprised of electromagnetic waves, having a wavelength approximately between 380 and 780 nm.

Other features of the luminous radiations are the radiation intensity ad geometry of the electromagnetic wave oscillation.

As to the oscillation geometry, also known as "polarisation", it can occur according to randomly oriented planes, also known as "random polarisation" or "non polarised", or according to a single plane ("linear polarisation"), i.e. within a cylindrical surface ("circular polarisation").

Naturally, light usually is not polarised. Reflection on reflecting surfaces (glazed doors, water surfaces, snow or ice surfaces, bright or wet asphalt) and having suitable angles, produces a certain degree of polarisation.

The effect is that of a glow coming from the zone of the surface where the polarised reflection is maximum. A remarkable inconvenience for the view is caused by the strong reflection. For example, this effect, on the water surfaces, prevents the vision under the water surface.

Polarising lenses are able to filter direct light as a standard "sun" lens and to eliminate (according to a certain degree of efficiency, polarised reflected light which is particularly troublesome.

Main comfort is the elimination of the fastidious reflexes normally present on the glazed doors, water mirrors, iced surfaces and asphalted roads.

Glasses polarised lenses are usually comprised of two thin lenses between which the polarising film is interposed.

Lenses and film are coupled by an adhesive placed on both faces of the film, thus realising an assembly having five layers:

- outer or "convex" lens;
- glue;
- polarising film;
- glue;
- inner or "concave" lens".

Additional outer or inner layers can be comprised of surface treatments to confer to the lenses particular esthetical or mechanical properties.

Optical properties of the whole assembled lens depends on the properties of the single layers and also on the geometrical regularity of the assembling phase. A uneven amount of glue, or non-parallelism among the different layers, produces optical effects not acceptable for the finished product (aberrations, distortions and optical definition loss).

The known assembling technique provides the use of preformed film (i.e. already curved by the manufacturer) and then the manual gluing after having applied the adhesive on both the film surfaces.

Then, adhesive is catalysed by UV lamps.

It can be easily understood that such a process does not ensure concentricity of filtering and transparent layers and thus of the liquid layers (adhesive) before the catalysation, with the consequent above mentioned optical defects.

Manual assembling operations are very expensive since they require a very long time and they must be carried out paying a great care by skilled personnel to avoid and eliminate air bubbles produced during the approaching of the lenses to the adhesive and already present on the same adhesive.

Figure 1A:
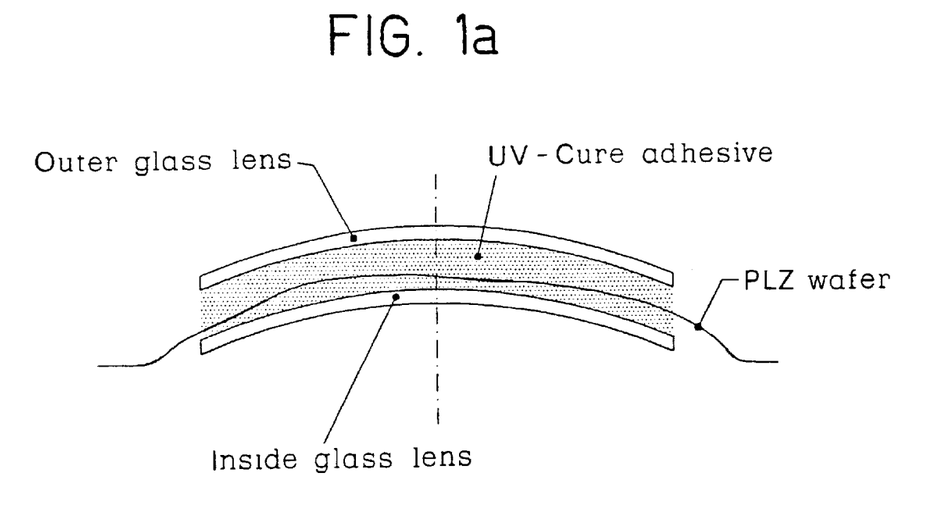
FIG. 1a is a section view of a polarising lens realised according to the known technique.

This kind of solution is shown for exemplificative purposes in FIG. 1a.

Up to date, the Applicant has privileged the production of glass polarising lenses, since the precision and geometrical stability of the lenses which are optically worked are preferred.

Generally speaking, technology employed until today to glue the lenses provides the shaping of the polarised film by different methods and then the manual gluing after having placed the adhesive on the two film surfaces.

Afterwards, catalysation of the adhesive is carried out by UV lamps.

Process according to the prior art does not ensure the concentricity of the filtering and transparent layers and thus the thickness of the liquid layers (adhesive), before catalysation.

Consequently, a series of optical defects occur such as aberrations, distortions and optical definition loss.

It is well evident that manual assembling operations are very expensive since they require a very long time and they must be carried out paying a great care by skilled personnel to avoid and eliminate air bubbles produced during the approaching of the lenses to the adhesive and already present on the same adhesive.

Main object of the present invention is that of solving the above mentioned drawbacks characteristic of the manual workings.

Particularly, the solution according to the present invention allows to obtain a high optical precision of the spherical surfaces comprising the lens, thus eliminating defects (air bubbles, ecc.).

Furthermore, the invention avoids any risk of low productivity, or in any case the need of a high number of personnel, being the process completely automated, and allows to obtain a high productive repetitiveness and a remarkable average quality standard.

These and other results are obtained according to the invention, providing improvement in the under vacuum application and shaping of the polarising film, in the prism, optical definition and aberration defects elimination, by the control of the curvature rays and of the thickness of the five layers comprising the lens, and by the realisation of a completely automatic plant for the realisation of the lens starting from blanks (lenses and polarising film).

It is therefore specific object of the present invention a plant for the continuous production of polarising lenses, comprising a coil polarising film feeding station; a glass convex lens feeding station; a concave lens feeding station; an under vacuum film shaping station on spherical moulds; a deposition and gluing outer convex lens station; a translation station for the pre-glued lenses; a deposition and gluing inner concave lens station; a lens separation and film cutting station; and a palletisation station for the finished lenses, said plant functioning automatically.

In a preferred embodiment of the plant according to the present invention said concave and convex lens deposition and gluing stations provide an approaching motion of the lens to the glue bead in such a way to realise a substantially point contact between lens and glue, without air trapping.

Preferably, according to the invention, the lens is approached to the bead with its axis not coinciding and after the contact a diagonal motion of the lens is realised until centring the same, followed by a slight vertical pressure to preliminarily spread the glue.

Still according to the invention, after said vertical pressure a spiral or circular rotatory motion can be carried out to further spread the and to homogenise the glue.

Preferably, according to the invention, said film fed on a coil is provided on a protection support, in said coil film feeding station a collection coil for the protection support being provided.

Furthermore, according to the invention, downward said glass convex lens feeding station an orienteering station is provided (to apply oriented coatings, such as degrading coatings, or for use with de-centred lenses, wherein optical centre does not coincide with the geometrical centre).

Always according to the invention, upward the palletisation station a marking section to mark the polarisation axis can be provided.

Furthermore, according to the invention, a washing station can be provided, wherein thin lenses to be glued can be washed by an automatic apparatus, employing suitable detergents, ultrasounds, rinsing by demineralised and osmotised water.

Still according to the invention, said washing station can be connected in correspondence of its end part where the washed lenses are returned, with the concave and convex lens feeding stations.

Preferably, according to the invention, two separate washing stations are provided, respectively for the inner and the outer lenses, for example employing two automatic washing machines (mainly in case of direct connection with the relevant charging station of the original gluing apparatus), or with a single automatic washing machine alternatively used for the two washings.

It is well evident that the automatic washing before the gluing phase is very important since it avoids to obtain defective finished lenses that cannot be recovered, due to the presence of impurties within the layers, caused to a not complete washing or to a subsequent deposit of dust, in case the lenses are washed in a separate apparatus.

Furthermore, according to the invention, the washing station and the gluing station are closed within a depulverised room, which is provided with a laminar air flow with absolute filters.

Always according to the invention, the finished product can be subjected to a washing in another automatic apparatus, preferably equal to the apparatus employed to wash the lenses to be glued, provided at the exit of the same gluing apparatus.

Automatic washing after gluing is very important since it eliminates the glue residuals (that as oleos residuals can contaminate also the lens surfaces), generally due to the dirtying of the mechanical parts of the gluing apparatus during the normal continuative work.

This washing station too, along with the other parts of the plant, can be closed within a depulverised room provided with laminar air flow with absolute filters.

Always according to the invention, it can be provided a testing station in order to be possible to test the finished lenses to verify cosmetic defects of any kind.

Said operation is important to reveal eventual defects induced by the same gluing phase, such as air bubbles and polarising film defects (impurities, holes or tears, plies).

Preferably, said operation is carried out by the integration of an automatic system, at the end of the gluing apparatus, said system employing artificial vision.

To this end, it is necessary the contemporaneous use of the automatic washing system, interposed between gluing and testing apparatuses.

In order to improve the uniformity of the glue layer between lens and film, on one or both the lenses, the application of a pressure on all or part of the lens surface, by a curved plug, can be provided during the gluing phase.

In this way, forcing the spreading of the glue, a better geometrical regularity of the layer and thus better optical performances of the finished coupled lens, is reached.

Furthermore, according to the invention, in order to confer to the finished lens particular features, polarising film having one or more of the following further properties can be used:

UV-blocking, i.e. a transmission close to 0% of UV radiation up to 400 nm;

high efficiency, i.e. high difference of the absorbency of polarised film when the film is perpendicular to the polarisation direction with respect to when it is parallel to the polarisation direction;

black-crossing, i.e. minimum variation of the colour tone of the polarised light when the film is perpendicular to the polarisation direction, with respect to when it is parallel to the polarisation direction.

Furthermore, according to the invention, in order to confer to the finished lens particular features, adhesive having one or more of the following further properties can be used:

UV-blocking, i.e. a transmission close to 0% of UV radiation;

high protection of the film with respect to the ageing and decolorisation (feature mainly connected to the UV absorption, since glue surrounds the film on the two surface);

high resistance to the impact breaking, in such a way to be able to easily satisfy the resistance requisites provided by the international rules;

high resistance to the delamination, i.e. better adhesiveness to the glass and film surfaces, in such a way to withstand to the outer physical-chemical agents aggression (such as humid and/or hot atmosphere, salted atmospheres, ecc.);

catalysation capability at a higher wavelength (particularly beyond UV), in such a way to be catalysed by broad spectrum UV blocking lamps (such as some kinds of polarising films and some kinds of glass and coating).

Always according to the invention, in order to allow the catalysation also in case of presence of layers blocking UV (such as some polarising films and some kinds of glass and coating), it is possible to use lamps having a broad emission spectrum, preferably combined with special adhesives.

It is further specific object of the present invention a process for the production of polarising lenses, comprising the steps of:

feeding polarising film from a coil;

feeding convex lenses;

feeding concave lenses;

under vacuum shaping the film on spherical moulds;

depositing and gluing the outer convex lenses;

translating the pre-glued lenses;

depose and gluing the inner concave lenses;

separating the lenses and eliminating the exceeding film from the single lenses;

palletsing the finished polarising lenses, all the steps of the process being performed automatically.

Preferably, according to the invention, said concave and convex lens deposition and gluing phases provide an approaching motion of the lens to the glue bead in such a way to realise a substantially point contact between lens and glue, with a coupling speed in function of the surface tension of the bead such as not to allow that the expansion front of the bead closes thus trapping air.

Always according to the invention, the lens is preferably approached to the bead with its axis not coinciding and after the contact a diagonal motion of the lens is realised until centring the same, followed by a slight vertical pressure to preliminarily spread the glue.

Still according to the invention, after said vertical pressure a spiral or circular rotatory motion can be carried out to further spread the and to homogenise the glue.

Furthermore, according to the invention, said film fed on a coil can be provided on a protection support to collected, when separated by a suitable coil.

Still according to the invention, said process can provide downward said glass convex lens feeding station an orienteering phase (to apply oriented coatings, such as degrading coatings, or for use with de-centred lenses, wherein optical centre does not coincide with the geometrical centre).

Always according to the invention, upward the palletisation station a marking phase to mark the polarisation axis can be provided.

Furthermore, according to the invention, a washing phase of the lenses to be glued and a washing phase of the final product can be provided.

Still according to the invention, an automatic testing phase of the finished product can be provided.

Always according to the invention, during said gluing phase the application of pressure on allow only on part of the surface of the lens can be provided.

Furthermore, according to the invention, in order to confer to the finished lens particular features, polarising film having one or more of the following further properties can be used:

UV-blocking, i.e. a transmission close to 0% of UV radiation up to 400 nm;

high efficiency, i.e. high difference of the absorbency of polarised film when the film is perpendicular to the polarisation direction with respect to when it is parallel to the polarisation direction;

black-crossing, i.e. minimum variation of the colour tone of the polarised light when the film is perpendicular to the polarisation direction, with respect to when it is parallel to the polarisation direction.

Furthermore, in order to confer to the finished lens particular features, adhesive having one or more of the following further properties can be used:

UV-blocking, i.e. a transmission close to 0% of UV radiation;

high protection of the film with respect to the ageing and decolorisation (feature mainly connected to the UV absorption, since glue surrounds the film on the two surface);

high resistance to the impact breaking, in such a way to be able to easily satisfy the resistance requisites provided by the international rules;

high resistance to the delamination, i.e. better adhesiveness to the glass and film surfaces, in such a way to withstand to the outer physical-chemical agents aggression (such as humid and/or hot atmosphere, salted atmospheres, ecc.);

catalysation capability at a higher wavelength (particularly beyond UV), in such a way to be catalysed by broad spectrum UV blocking lamps (such as some kinds of polarising films and some kinds of glass and coating).

Finally, according to the invention, in order to allow the catalysation also in case of the presence of layers blocking UV rays (such as in some kind of polarising films and some kinds of glass or coating), lamps having a broad emission spectrum, preferably combined with special adhesives, are used.

The present invention will be now described, for illustrative but not limitative purposes, according to its preferred embodiments, with particular reference to the figures of the enclosed drawings, wherein.

FIGS. from 4a to 4f schematically show the different phases of the shaping and gluing procedure.

In FIG. 1a, the structure of a polarising lens according to the prior art is shown, wherein between an outer glass and an inner glass the pre-shaped polarising film is placed. Manual gluing of the lenses and the film is troublesome. Furthermore, the pre-shaping of the polarising film induces some deformations of the coupling.

Figure 1B:
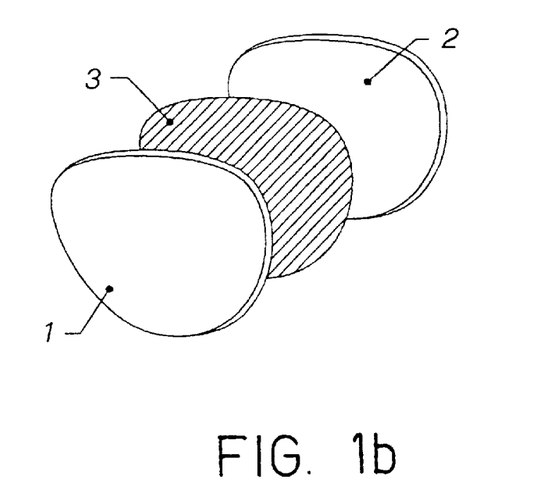
FIG. 1b is an exploded view of a glass polarising lens realised by the gluing technique of two caps with the polarising film.
Figure 1C:
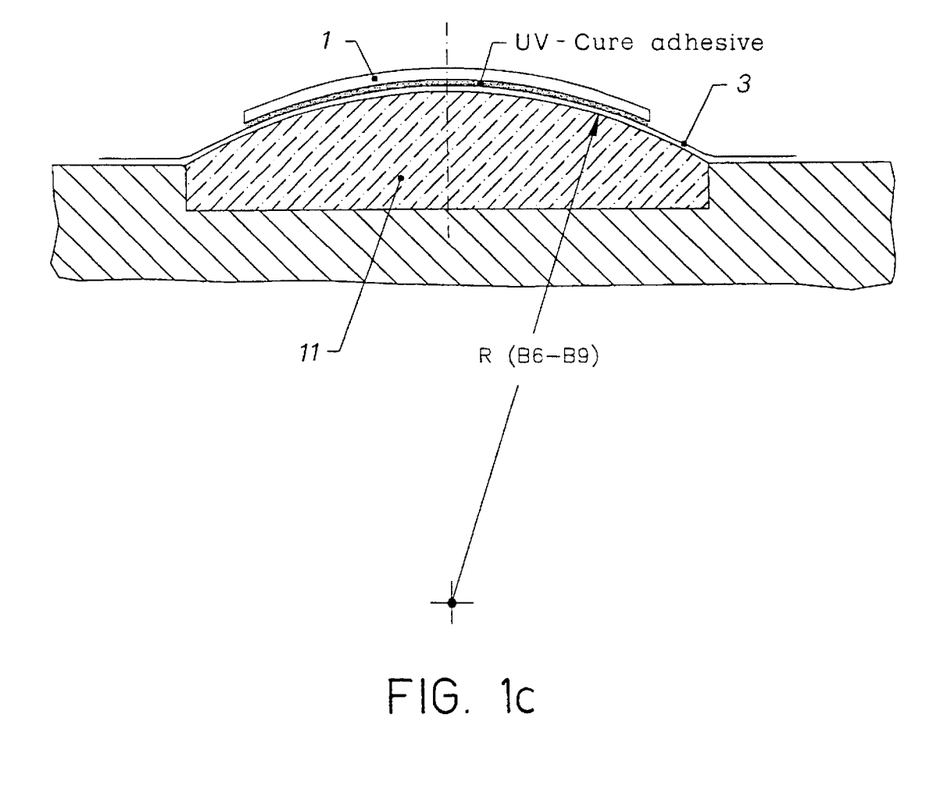
FIG. 1c is a section view of a lens according to the invention during the first assembling phase.

Observing now FIGS. 1b and 1c, it can be seen a lens realised according to the present invention, comprising an outer lens 1, an inner lens 2 and a polarising wafer 3 placed between said lenses 1 and 2 and coupled with the outer lens by UV activated UV adhesive.

Figure 2:
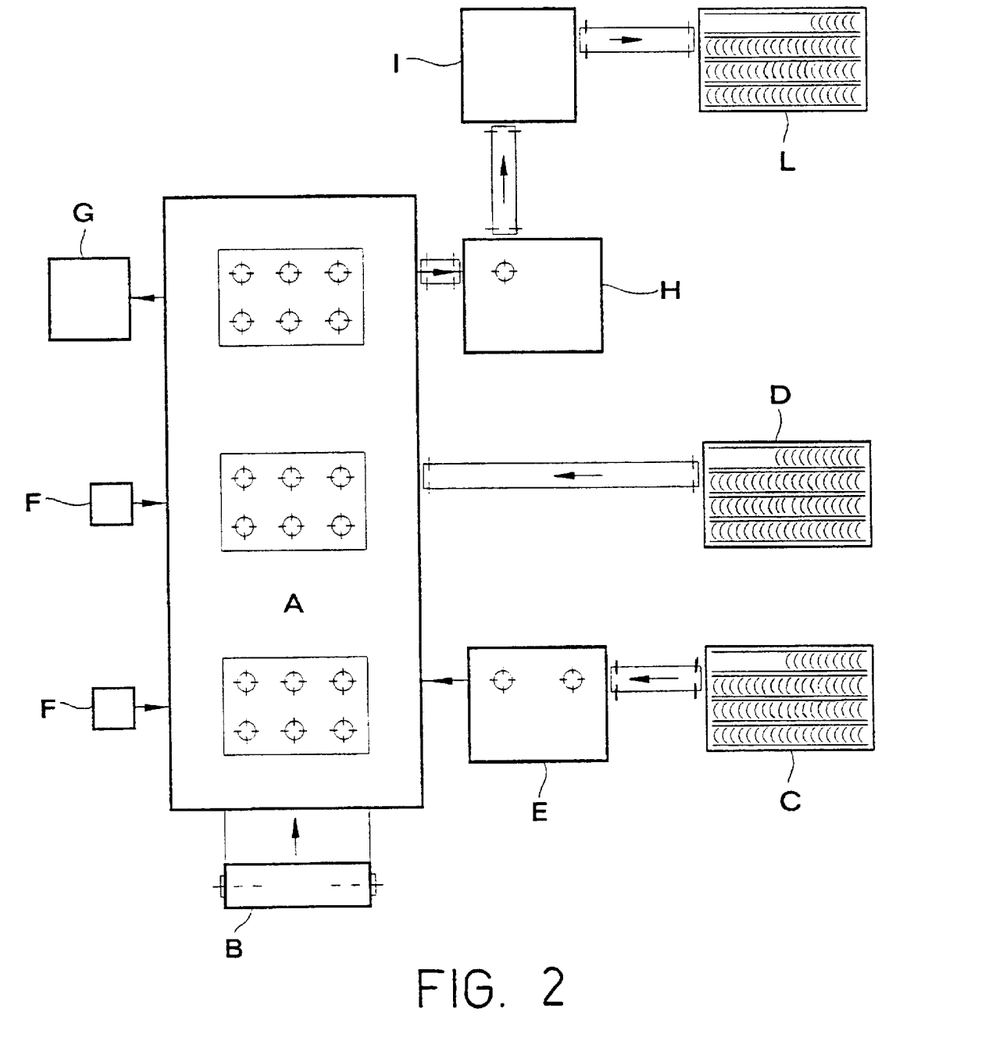
FIG. 2 is a block diagram of the operation of the plant according to the invention.

Making now shortly reference to FIG. 2, from the block diagram it is possible to individuate gluing machine A, polarising film feeding section B, outer lens feeding section C, inner lens feeding section D, eventually the outer lens orienteering station E (blurred e out of centre), adhesive feeding station F, protective film exit and polarising discharge station G, station H for trimming of the film on the finished lens, eventually polarisation axis marking station I (this operation could also not be present), and station L for depositing the finished lenses.

Figure 3:
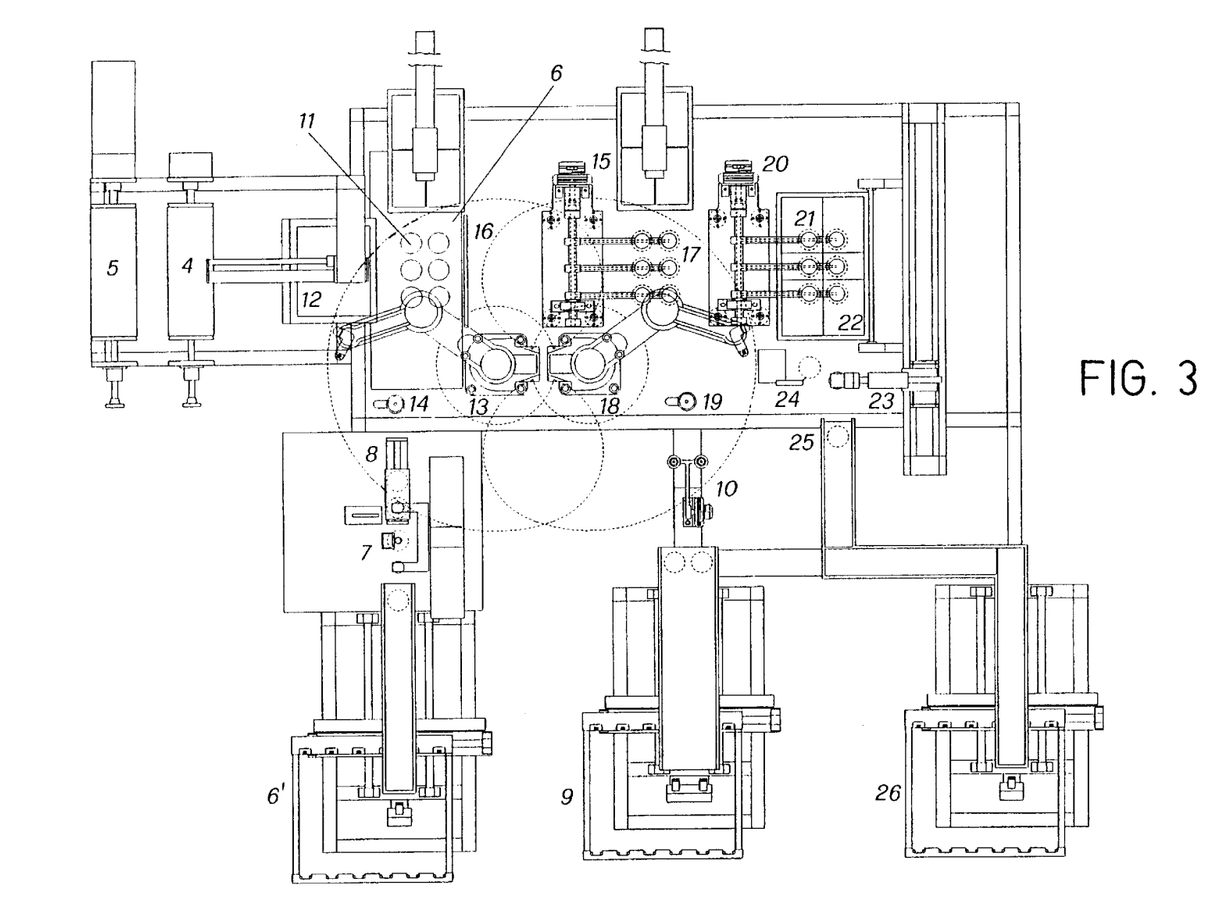
FIG. 3, is a plan schematic view of the plant according to the invention.

The plant according to the invention, which is schematically shown in FIG. 3, provides the use of blanks such as two thin lenses 1 and 2, eventually treated by coating, the film or polarised wafer and the adhesive, allowing to obtain the complete assembled lens.

Operations carried out in the plant according to the invention are all automatic and connected each other, so that the intervention of the personnel is required only for (intermittently) charging of the materials and for the general supervision of the plant.

Schematising the logic of operation of the plant, it is possible to individuate the following main logical groups:

a) feeding of the polarising film from a coil and collection of the protection film (if necessary) in coils;

b) feeding of convex lenses, with eventual orienteering station (for application of oriented coating, such as degrading coatings, or for the application with out of centre lenses, having the optical centre not coinciding with the geometrical centre);

c) feeding concave lenses;

d) under vacuum shaping of the film on spherical moulds;

e) deposition and gluing of outer convex lenses;

f) translation of the pre-glued lenses;

g) deposition and gluing of inner concave lenses;

h) separation of the lenses and cut of the exceeding film from the single lenses;

i) palletisation of the finished polarising lenses on frames.

Coming now to particularly observe FIG. 3 of the drawings, the feeding step of the polarising film occurs with the film provided on rolls.

In view of the little thickness of the film (about 0.04 mm), the same can be provided on a plastic support having a slightly bigger thickness and which is adhesive, in such a way to preserve its integrity before its use.

Thus, the plant according to the invention provides a roll 4 receiving the film coil; the film, eventually with the support, is unwound and, passing trough rolls determining a sharp deviation with a short ray, is detached from the support, which is again rolled on another roll 5.

Now, the separated film proceeds toward the inner part of the plant and particularly toward the shaping station, generically indicated by the reference number 6.

Dragging occurs by the roll 5 collecting the support, said roll pulling the support and thus indirectly the film; roll 4 of the film is provided with a friction in such a way to maintain the film with the proper tension.

As to the feeding phase of the glass convex lenses, they are singularly provided within metallic racks.

A plurality of racks is provided in a housing structure provided with a bidimensional plan movement, in such a way to bring each lens according to a sequence in the same charging position 6.

Single lens is lifted by a pneumatic actuator with a little inclination with respect to the vertical, in such a way to make it ascend resting on a metallic plane without turnover.

Lens is then deposited on a conveyor belt bringing the same in the operative position of the other parts of the plant.

Before using the same, it is provided the possibility of orienteering the (circular) lenses, when they have a blurred surface coloration, so as to have the blurred direction oriented in a definite way with respect to the polarisation axis (geometrically determined by the film advancement direction).

Orienteering station 7 uses a vision system provided with a matrix camera watching a sector of the lens by transparency with respect to a lightening apparatus. Lens is rotated under the control of the vision system until obtaining the correct positioning in function of the blurring.

Each single lens is collected from the conveyor belt, deposited in the orienteering station, collected from the latter and deposited in a two position station 8 by a two arm pneumatic device.

The two position deposit station 8 is necessary since the following robot charges two lenses each time.

Concave lenses are singularly placed within metallic racks. A plurality of racks is provided within a housing structure having a bidimensional plane motion, in such a way to bring each lens according to a specific sequence in the same charging position 9.

This station is perfectly identical to the other one, with the sole difference that the lenses are collected in parallel pair by two pneumatic lifters, since the following robot charges two lenses each time.

Before their use, lenses are upturned by a pneumatic control device 10, to have the overturned grip of the lens, since the inner lens must be glued on the outer surface.

The film separated from the support runs toward the inside of the machine, is placed on a multiple mould 11, to exactly assume the same curvature of the lens to be obtained.

As it can be seen from FIGS. from 4a to 4f, the shape is obtained heating for few seconds the film by an upper electrical radiator which is brought in position only during the operation, and by the application of vacuum between the mould 11 and the film.

Figure 4:
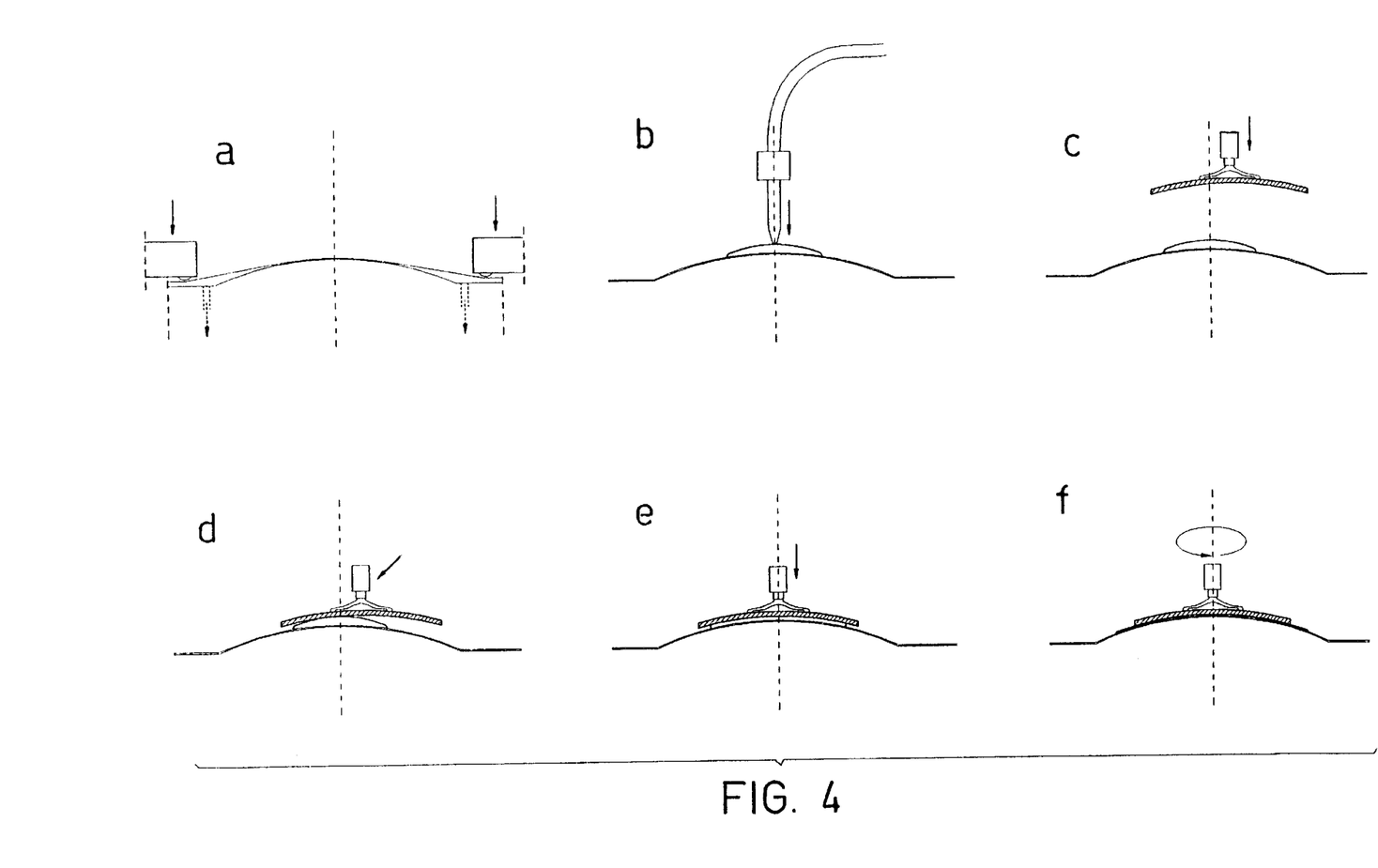

Vacuum allows to obtain the perfect shaping of the film, while the heating allows its deformation without tearing or defects of the film.

The deposition and gluing phase of the (outer) convex lens 1 is carried out by a quite precise robot 13, in this case a "scara" kind robot. Precision must be remarkable both for ripetitiveness of the positions and, mainly, for the maximum softness and regularity of the movement.

Robot collects a couple of lenses from the deposit station 8 and brings them on a ionisation device 14 that, by a ionised airflow, eliminates eventual dust particles and prevents their deposition shortly after.

Afterwards, the robot is positioned on the gluing zone (FIG. 4b) (in this case coinciding with the shaping mould), deposits a determined amount of adhesive (dosed by a volumetric metering) and then approaches the lens on the adhesive (FIG. 4c).

This approaching movement of the lens to the adhesive bead is the most peculiar feature of the plant according to the invention (see in particular FIGS. 4c–4f).

The realised approaching and the geometry of the movements eliminates the creation of air bubbles and makes it possible the gluing without the supervision and the work of a man.

The gluing movement is comprised of two preparation phases of the lens and of other approaching and motion phases of the lens.

FIG. 4a: shaping of the polarising film on a mould, by heating and application of the vacuum to adhere the film to the mould.

FIG. 4b: dosing of the adhesive.

FIG. 4c: fast approaching of the lens to the film, in the correct position on the mould by an out of centre and vertical motion, without any contact with the adhesive.

FIG. 4d: approaching of the lens on the liquid adhesive bead with a suitable motion law. Diagonal movement of the lens with pressure of the adhesive to avoid the creation of bubbles.

FIG. 4e: centring the lens and distribution of the adhesive by a movement realising the uniform thickness and constant of the liquid.

FIG. 4f: final compaction spiral or circular rotatory motion to spread and homogenise the adhesive (this operation can is not indispensable and can also be omitted).

At the end of the charging in the shaping station, the catalysation is carried out by UV lamps.

Now, lens group, still coupled to the polarising film (both among them and with the coil of film), it is collected from the mould by a multiple suction cups device 15, providing to the advancement and to the following turnover of the lens group.

Between the translation and turnover operations, the film (still continuous) is transversely cut by a thin hot electric resistance 16.

After the turnover, lenses are directly in the deposition position 17 of (inner) concave lenses 2.

The operation is carried out by a second robot 18, similar to the preceding one.

The robot 18 collects a pair of lenses from the deposit station 10 and brings them on a ionisation device 19 that, with a ionised air flow, eliminates possible dust particles and prevents their deposition shortly after.

As it occurred for the first lens 1, robot 18 is positioned on the gluing zone 17, deposits a determined amount of adhesive and then approaches the lens to the adhesive.

The same deposition and catalysation steps used for the convex lenses (FIGS. 4a–4f) are also respected.

The lens group, still coupled each other by the polarising film, is again upturned by a multiple suction cups device 20, and brought to the separation position 21.

The separation occurs by a grid of thin hot electric resistances 22, by a pneumatic rotatory movement.

Each single lens is collected by a numeric control handling device 23 and temporarily deposited in a trimming station 24, where the exceeding part of the film with respect to the "coupled" kind lens (lens, film, lens) is eliminated by an oscillating blade and the rotation of the lens.

Handling device 23 takes again the lens and deposit the same on the discharge conveyor belt 25 for the finished lenses.

Finished lenses are singularly placed within racks. A plurality of racks is placed in a housing structure provided with a bidimensional plane movement, in such a way to bring each lens according to a sequence in the predetermined discharge position 26. The system is mechanically equivalent to the charging stations, being used with a reverse lens flow.

The present invention has been described for. illustrative but not limitative purposes, according to its preferred embodiments, but it is to be understood that modifications and/or changes can be introduced by those skilled in the art without departing from the relevant scope as defined in the enclosed claims.

What is claimed is:

1. A plant for the continuous production of polarizing lenses, comprising:

a coil polarizing film feeding station;

a glass convex lens feeding station;

a concave lens feeding station;

a vacuum film shaping station having spherical moulds, the coil polarizing film feeding station configured to automatically feed polarizing film from a coil to the vacuum shaping station, the vacuum film shaping station configured to automatically vacuum shape the film on the spherical moulds to form a shaped film;

a deposition and gluing outer convex lens station configured for automatically robot feeding an outer convex lens to the shaped film to contact a glue bead on the shaped film;

a translation station for pre-glued lenses;

a deposition and gluing inner concave lens station configured for automatically robot coupling of a concave lens to the shaped film;

a lens separation and film cutting station for trimming the film from a finished lens; and a palletization station for the finished lenses, wherein said concave and convex lens deposition and gluing stations comprise a robot arm with controlling means for controlling the robot arm to approach the lens to a glue bead and contact the lens to the glue bead to provide a substantial point of contact between the lens and the glue bead free of any trapped air, and the controlling means controls the robot arm i) so that the lens is approached to the glue bead with an axis of the lens not coinciding with an axis of the glue bead at the point of contact between the lens and the glue bead, ii) so that after the point of contact is accomplished, the robot arm realizes a diagonal motion of the lens with respect to the glue bead to center the lens on the glue bead, and iii) so that after the lens is centered on the glue bead, a vertical pressure is applied by the robot arm to the lens to spread the glue to a uniform thickness and free of any trapped air.

2. The plant of claim 1, wherein, the controlling means further controls the robot arm so that after the vertical pressure is applied to spread the glue, the robot arm carries out a spiral or circular rotary motion against the lens to further spread and homogenize the glue.

3. The plant of claim 1, wherein the coil film feeding station comprises a collection coil for a protection support provided on said film.

4. The plant of claim 1, further comprising:

an orienting station, located downward of said glass convex lens feeding station, to apply oriented coatings to the lens.

5. The plant of claim 1, further comprising:

a marking section for marking a polarization axis located upward of the palletization station.

6. The plant of claim 1, further comprising:

a washing station for automated washing of lenses yet to be glue.

7. The plant of claim 6, wherein the washing station comprises at least one of a detergent element, an ultrasound element, a rinsing by demineralized water part, and rinsing by osmotized water part.

8. The plant of claim 6, wherein the washing station is connected in correspondence of an end part where washed lenses are returned, to the concave and convex lens feeding stations.

9. The plant of claim 6, wherein the washing station comprises a washing station for inner lenses and a washing station for outer lenses.

10. The plant of claim 6, wherein the washing station comprises a single automated washing machine.

11. The plant of claim 6, wherein the washing station and the gluing stations are closed within a depulverized room, the depulverized room comprising absolute filters for providing laminar air flow within the room.

12. The plant of claim 6, further comprising:

a final washing station downward of said lens separation and film cutting station for washing the finished lenses.

13. The plant of claim 12, wherein said washing station and said final washing station are of the same type.

14. The plant of claim 1, further comprising;

a depulverized room provided with absolute filters and a laminar air flow system.

15. The plant of claim 1, further comprising:

a testing station to test the finished lenses for defects.

16. The plant of claim 15, wherein, said testing station is located downward of said deposition and gluing inner concave lens station; and said testing station comprises an automated artificial vision system.

17. The plant of claim 2, wherein the robot arm comprises a curved plug for applying the vertical pressure to provide a uniform glue layer between the lens and an underlying film.

18. An automated method of producing polarizing lenses, comprising the steps of:

feeding polarizing film from a coil to a vacuum shaping station;

vacuum shaping the film on a spherical mould;

applying a glue bead to an upper surface of the shaped film;

robot feeding an outer convex lens to the shaped film and contacting the glue bead; and robot pressing the convex lens against the glue bead on the shaped film to form a convex lens and film part, a space between the convex lens and the film being of a constant thickness, filled with glue and free of any trapped air, wherein all the steps are automated, and in said step of robot feeding the outer convex lens to the shaped film to contact the glue bead, the lens approaches the glue bead with an axis of the lens being non-coincident with an axis of the glue bead, after contacting the lens to the glue bead, the lens is diagonally moved to center the axis of the lens with the axis of the glue bead, and a vertical pressure is applied via the lens to initially spread the glue of the glue bead.

19. The method of claim 18, comprising the further steps of:

feeding an inner concave lens to a gluing station;

applying a glue bead to an upper surface of the concave lens;

bringing the convex lens and film part to the concave lens to contact the glue bead;

pressing the convex lens against the glue bead on the concave lens to form a uniform thickness of glue free of trapped air intermediate the film and the concave lens, wherein a bonded lens is formed, and all the steps are automated.

20. The method of claim 19, comprising the further steps of:

eliminating excess film from the bonded lens to form a finished polarizing lens; and palletizing the finished polarizing lens, wherein all the steps are automated.

21. The method of claim 18, wherein, in said step of robot feeding the outer convex lens to the shaped film to contact the glue bead, a coupling of lens to the shaped film at a substantial point of contact has a coupling speed controlled as a function of a surface tension of the glue bead so as to avoid an expansion front of the glue bead from trapping air.

22. The method of claim 18, wherein, after said initial spreading of the glue, said step of robot pressing the convex lens against the glue bead on the shaped film to form a convex lens and film part, includes a vertical pressure with a spiral motion to further spread and homogenize the glue.

23. The method of claim 18, wherein, after said initial spreading of the glue, said step of robot pressing the convex lens against the glue bead on the shaped film to form a convex lens and film part, includes a vertical pressure with a rotary motion to further spread and homogenize the glue.

24. The method of claim 20, comprising the further steps of:

providing the film on a protection support;

separating the film from the protection support; and collecting the protection support on a collection coil.

25. The method of claim 18, comprising the further step of:

applying an oriented coating to said convex lens.

26. The method of claim 20, comprising the further step of:

prior to said step of palletizing, marking a polarization axis of the lens.

27. The method of claim 18, comprising the further step of:

washing the lens to be glued.

28. The method of claim 20, comprising the further step of:

automated testing of the finished lens.

29. The method of claim 18, wherein, in said step of pressing the convex lens against the glue bead on the shaped film, pressure is applied only on a part of an upper surface of the convex lens.

30. The method of claim 19, comprising the further step of:

catalyzing the glue with lamps having a broad emission spectrum.

31. An automated method of producing polarizing lenses, comprising the steps of:

feeding polarizing film from a coil to a vacuum shaping station;

vacuum shaping the film on a spherical mould to form a shaped film;

applying a glue bead to an upper surface of the shaped film;

feeding an outer lens to the shaped film and contacting the glue bead, in feeding the outer lens to the shaped film, the lens approaches the glue bead with an axis of the lens being non-coincident with an axis of the glue bead, the lens initially contacting the glue bead with the axis of the lens being non-coincident with the axis of the glue bead;

after contacting the lens to the glue bead, diagonally moving the lens to coincide the axis of the lens with the axis of the glue bead; and coupling of lens to the shaped film with a coupling speed controlled as a function of a surface tension of the glue bead so as to avoid an expansion front of the glue bead from trapping air, wherein a space is provided between the convex lens and the film of a constant thickness, filed with glue and free of any trapped air, and wherein all the steps are automated.

32. The method of claim 31, comprising the further steps of:

feeding an inner concave lens to a gluing station;

applying a glue bead to an upper surface of the concave lens;

bringing the convex lens and film part to the concave lens to contact the glue bead;

pressing the convex lens against the glue bead on the concave lens to form a uniform thickness of glue free of trapped air intermediate the film and the concave lens, wherein a bonded lens is formed, and all the steps are automated.

33. The method of claim 32, comprising the further steps of:

eliminating excess film from the bonded lens to form a finished polarizing lens; and palletizing the finished polarizing lens, wherein all the steps are automated.

* * * * *